United States Patent
Ambartsumov et al.

(10) Patent No.: US 10,901,992 B2
(45) Date of Patent: Jan. 26, 2021

(54) SYSTEM AND METHOD FOR EFFICIENTLY HANDLING QUERIES

(71) Applicant: KMS Lighthouse Ltd., Bnei Braq (IL)

(72) Inventors: Stanislav Ambartsumov, Irkutsk (RU); Lev Garkavy, Yavne (IL); Moshe Recanati, Givat Shmuel (IL)

(73) Assignee: KMS Lighthouse Ltd., Bnei Braq (IL)

( * ) Notice: Subject to any disclaimer, the term of this patent is extended or adjusted under 35 U.S.C. 154(b) by 237 days.

(21) Appl. No.: 15/620,152

(22) Filed: Jun. 12, 2017

(65) Prior Publication Data
US 2018/0357282 A1 Dec. 13, 2018

(51) Int. Cl.
| | | |
|---|---|---|
| G06F 16/00 | (2019.01) | |
| G06F 16/2453 | (2019.01) | |
| G06F 16/9032 | (2019.01) | |
| G06F 16/903 | (2019.01) | |
| G06Q 30/00 | (2012.01) | |
| G06F 17/00 | (2019.01) | |

(52) U.S. Cl.
CPC .. *G06F 16/24549* (2019.01); *G06F 16/90332* (2019.01); *G06F 16/90335* (2019.01); *G06Q 30/016* (2013.01)

(58) Field of Classification Search
None
See application file for complete search history.

(56) References Cited

U.S. PATENT DOCUMENTS

| | | | |
|---|---|---|---|
| 6,085,201 A | 7/2000 | Tso | |
| 6,182,083 B1 | 1/2001 | Scheifler et al. | |
| 6,584,464 B1 | 6/2003 | Warthen | |
| 6,675,159 B1 * | 1/2004 | Lin | G06F 40/253 |
| 6,829,603 B1 * | 12/2004 | Chai | G06F 16/3344 |
| 7,765,236 B2 | 7/2010 | Zhai et al. | |
| 7,953,720 B1 * | 5/2011 | Rohde | G06F 16/951 707/706 |
| 10,170,014 B2 * | 1/2019 | Beason | G06F 40/30 |
| 10,176,804 B2 * | 1/2019 | Jiang | G10L 25/51 |
| 10,346,452 B2 * | 7/2019 | Iwama | G06F 16/90332 |
| 2003/0069880 A1 * | 4/2003 | Harrison | G06F 16/3334 |
| 2004/0243568 A1 * | 12/2004 | Wang | G06F 16/313 |
| 2005/0273812 A1 * | 12/2005 | Sakai | H04N 21/4755 725/35 |
| 2007/0122792 A1 * | 5/2007 | Galley | G09B 7/02 434/353 |
| 2008/0294637 A1 | 11/2008 | Liu | |
| 2009/0070322 A1 * | 3/2009 | Salvetti | G06F 16/3334 |
| 2012/0078636 A1 * | 3/2012 | Ferrucci | G06F 16/24564 704/270.1 |

(Continued)

OTHER PUBLICATIONS

Unger et al. "Template-based Question Answering over RDF Data", Apr. 16-20, 2012, ACM (Year: 2012).*

*Primary Examiner* — Polina G Peach
(74) *Attorney, Agent, or Firm* — M&B IP Analysts, LLC

(57) ABSTRACT

A system and method for handling queries. The method includes receiving a query; determining, based on the received query, a best matching template question; selecting, from among a plurality of question templates, a question template for responding to the query, wherein the selected question template includes the determined best matching template question and a set of answers assigned to the selected question template; and generating, based on the selected question template, a response to the query.

9 Claims, 9 Drawing Sheets

(56) References Cited

U.S. PATENT DOCUMENTS

| | | | |
|---|---|---|---|
| 2013/0226846 A1* | 8/2013 | Li | G06N 5/02 706/12 |
| 2014/0006012 A1* | 1/2014 | Zhou | G06F 16/3344 704/9 |
| 2014/0272884 A1* | 9/2014 | Allen | G09B 7/04 434/322 |
| 2014/0344261 A1* | 11/2014 | Navta | G06F 16/951 707/723 |
| 2014/0358889 A1* | 12/2014 | Shmiel | G06F 17/2745 707/710 |
| 2014/0358890 A1* | 12/2014 | Chen | G06F 16/3329 707/710 |
| 2015/0142851 A1* | 5/2015 | Gupta | G06F 16/9032 707/779 |
| 2016/0247068 A1* | 8/2016 | Lin | G06N 5/02 |
| 2017/0011023 A1* | 1/2017 | Ghannam | G06F 16/90332 |
| 2017/0032689 A1* | 2/2017 | Beason | G06F 40/30 |
| 2017/0364520 A1* | 12/2017 | Venkataraman | G06F 17/212 |
| 2018/0181673 A1* | 6/2018 | Liu | G06F 16/3329 |

\* cited by examiner

FIG. 9

SYSTEM AND METHOD FOR EFFICIENTLY HANDLING QUERIES

TECHNICAL FIELD

The present disclosure relates generally to providing responses to queries, and more particularly to efficient retrieval of responses to free text queries.

BACKGROUND

Customer Search Representatives (CSRs) traditionally function by verbally answering customers' questions or concerns over the phone, which typically provides the customer with the assistance needed while providing the customer with human interaction. However, responding to queries via CSRs may be costly, inefficient, and require a live human operator at all times. Additionally, responses provided by CSRs are subject to human error.

Some automated solutions for providing responses to queries exist. As an example, some solutions allow users to select from a predetermined menu of options representing questions associated with answers stored in a database. However, such menu-based solutions may be difficult to navigate, and do not allow the user to freely enter queries (i.e., if a question is not among the menu options, such solutions typically cannot provide an appropriate answer).

As another example, search engines may be utilized to search for related content based on a query. However, existing search engine-based solutions typically only superficially recognize content of the query by searching for content featuring words matching words included in the query. Results obtained via such solutions are often only tangentially related (or unrelated entirely) to the information sought by the user.

As yet another example, some existing solutions allow for receiving textual queries and providing closely related responses by searching through a comprehensive knowledge database. However, such comprehensive knowledge databases must typically include a large number of specific queries along with associated answers, resulting in significant use of storage and inefficiencies in retrieving responses.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for handling queries. The method comprises: receiving a query; determining, based on the received query, a best matching template question; selecting, from among a plurality of question templates, a question template for responding to the query, wherein the selected question template includes the determined best matching template question and a set of answers assigned to the selected question template; and generating, based on the selected question template, a response to the query.

Certain embodiments disclosed herein also include a non-transitory computer readable medium having stored thereon causing a processing circuitry to execute a process, the process comprising: receiving a query; determining, based on the received query, a best matching template question; selecting, from among a plurality of question templates, a question template for responding to the query, wherein the selected question template includes the determined best matching template question and a set of answers assigned to the selected question template; and generating, based on the selected question template, a response to the query.

Certain embodiments disclosed herein also include a system for handling queries. The system comprises: a processing circuitry; and a memory, the memory containing instructions that, when executed by the processing circuitry, configure the system to: receive a query; determine, based on the received query, a best matching template question; select, from among a plurality of question templates, a question template for responding to the query, wherein the selected question template includes the determined best matching template question and a set of answers assigned to the selected question template; and generate, based on the selected question template, a response to the query.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 9 is a screenshot illustrating a comparison chart provided as a response to a user query.

DETAILED DESCRIPTION

Figure 1:
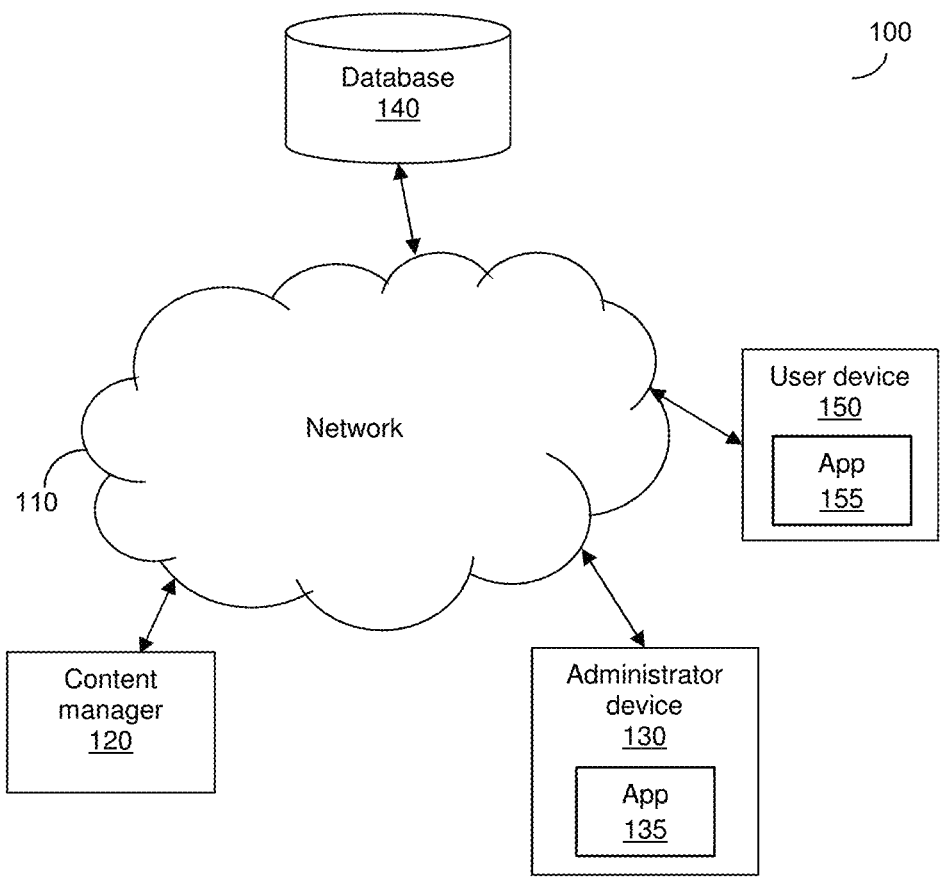
FIG. 1 is a network diagram utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include methods and systems for efficiently handling queries. In an example implementation, a customer service department can pre-define question templates for generating questions that allow for efficient responses based on free text or other unstructured queries from customer service representatives or end users, typically within a few seconds. The question templates may further include answers used for providing the responses.

In an embodiment, template inputs are received. The template inputs may include inputs defining template questions, inputs defining answers, and inputs assigning question templates to subjects. In an optional embodiment, the template questions, the answers, or both, may be modified based on at least one modification rule. Based on the received template inputs, at least one question template is created.

In an embodiment, when the question templates are created, a query may be received. A user question is determined based on the received query and the question templates. A response is provided based on the determined question. The response includes at least the answer assigned to a question template including the determined question.

FIG. 1 shows an example network diagram 100 utilized to describe the various disclosed embodiments. In the example network diagram 100, a content manager 120, an administrative device 130, a database 140, and a user device 150 are communicatively connected via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

The administrator device 130 is utilized by an administrator to provide inputs utilized for creating question templates. The administrator device 130 may be, but is not limited to, a personal computer, a laptop, a tablet computer, a smartphone, a wearable computing device, or any other device capable of receiving and displaying notifications. The administrator device 130 may have installed thereon an agent 135 which is configured to receive inputs from an administrator using the administrator device 130 and to send template parameters defining question templates to the content manager 120 based on the received inputs. The agent 135 may be, but is not limited to, an application such as a mobile application, a virtual application, a web application, a native application, and the like. The administrator device 130 may include a display (not shown) for displaying graphical user interfaces for receiving selections of template parameters (e.g., as shown in the example screenshots of FIGS. 4 and 5).

The database 140 stores at least question templates as well as assignments of question templates. Each question template includes, but is not limited to, at least one template question, where each template question is defined by a set of template question parameters. Each question template is assigned to at least one subject and has a set of at least one answer assigned to it. Each answer may include information, visual content, or both.

The user device 150 may be, but is not limited to, a personal computer, a laptop, a tablet computer, a smartphone, a wearable computing device, or any other device capable of receiving and displaying notifications. The user device 150 may be, for example, a user device of a CSR or a customer seeking an answer to a question. The user device 150 have installed thereon an agent 155 which is configured to receive user inputs indicating queries, to send queries based on the user inputs, and to receive responses to the queries from the content manager 120. The agent 155 may be, but is not limited to, an application such as a mobile application, a virtual application, a web application, a native application, and the like. In an example implementation, the agent 155 may be a web browser.

In an embodiment, the content manager 120 is configured to receive, from the administrator device 130, template inputs. The template inputs may include, but are not limited to, question-related inputs, assignment inputs, answer-related inputs, combinations thereof, a portion thereof, and the like. In a further embodiment, the content manager 120 is configured to create at least one question template based on the template inputs. Each question template includes at least one template question, is assigned to at least one subject, and has an answer set including at least one answer assigned thereto. In some embodiments, each question template may include the assigned answer set. A subject is a person, place, or thing. Example subjects include, but are not limited to, a product, a service, a company, and the like.

The question-related inputs include at least one set of template question parameters that may include, but are not limited to, subject variables, characteristic variables, terms forming a structure of the question (e.g., "who", "what", "when", "where", "why", "how", "is", "are", "the", "does", "can", etc.), terms indicating degree (e.g., "much", "many", "amount", "number", etc.), images or other multimedia content submitted as a query, and any other information utilized to define questions. Each set of template question parameters defines a template question.

In some implementations, a set of template question parameters may define a unique template question that is unique to a particular subject. Such a unique template question typically does not include variable template question parameters (e.g., subject variables or characteristic variables), and is typically not applied to multiple subjects.

Each subject variable represents a subject of a template question, and is replaced with the subject when utilized for determining user questions, thereby allowing for use of the same template question to define different potential user questions for different subjects. Each characteristic variable represents a characteristic or component of the subject, and is replaced with the characteristic or component when utilized for determining user questions, thereby allowing for use of the same set of template question parameters to define different potential user questions for different characteristics or components of a subject.

As a non-limiting example, a template question may include the set of template question parameters "What is the availability of the [Subject_Title]", where "[Subject_Title]" is the subject variable, such that the user questions determined based on the set of template question parameters may include "What is the availability of the iPhone 7" and "What is the availability of the "Samsung Galaxy S8" when the question is assigned to the subjects "iPhone 7" and "Samsung Galaxy S8," respectively.

As another non-limiting example, a template question may include the template question parameters "Does [Subject_Title] have [Characteristic_Title]", where "[Subject_Title]" is the subject variable and "[Characteristic_Title]" is the characteristic variable, such that the user questions determined based on the set of template question parameters may include "Does iPhone 6 have camera", "Does iPhone 6 have headphone jack", "Does Samsung Galaxy S8 have camera", and "Does Samsung Galaxy S8 have headphone jack" when the template question is applied to combinations of one of the subjects "iPhone 6" or "Samsung Galaxy S8" with one of the characteristics "camera" or "headphone jack".

The assignment inputs indicate, for each question template to be created, at least one subject to which the question template is assigned. The assignment inputs may further indicate a characteristic to which one or more of the template questions are assigned. The characteristics to which a template question is assigned are characteristics for which the template question (and, consequently, corresponding answers) may be relevant. As a non-limiting example, for a characteristic of "business hours", template questions such as "What are the [Characteristic_Title] for [Subject_Title]" and "When is [Subject_Title] open" may be assigned to the characteristic such that the "[Characteristic_Title]" is replaced with "business hours" when determining user questions and the [Subject_Title] may be replaced with subjects such as "Dave's Hardware" (i.e., a particular store) or "West Orange NJ ABC Chain Restaurant" (i.e., a branch of a company having multiple stores).

Figure 6:
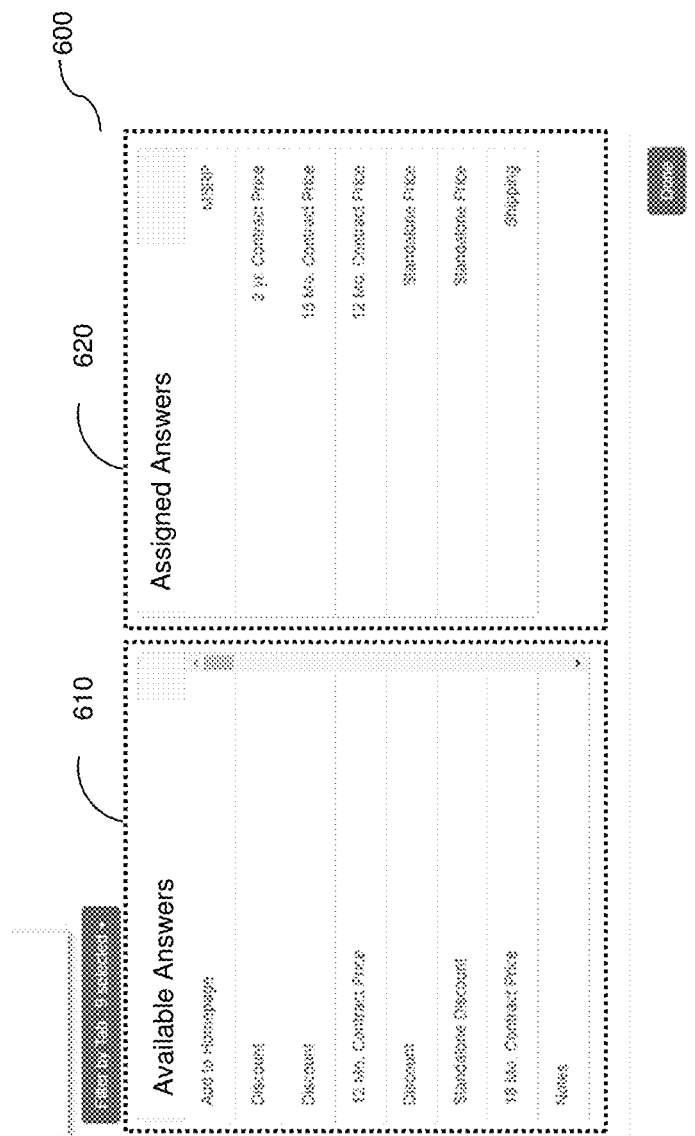
FIG. 6 is a screenshot illustrating a graphical user interface for providing answer-related inputs.
Figure 7:
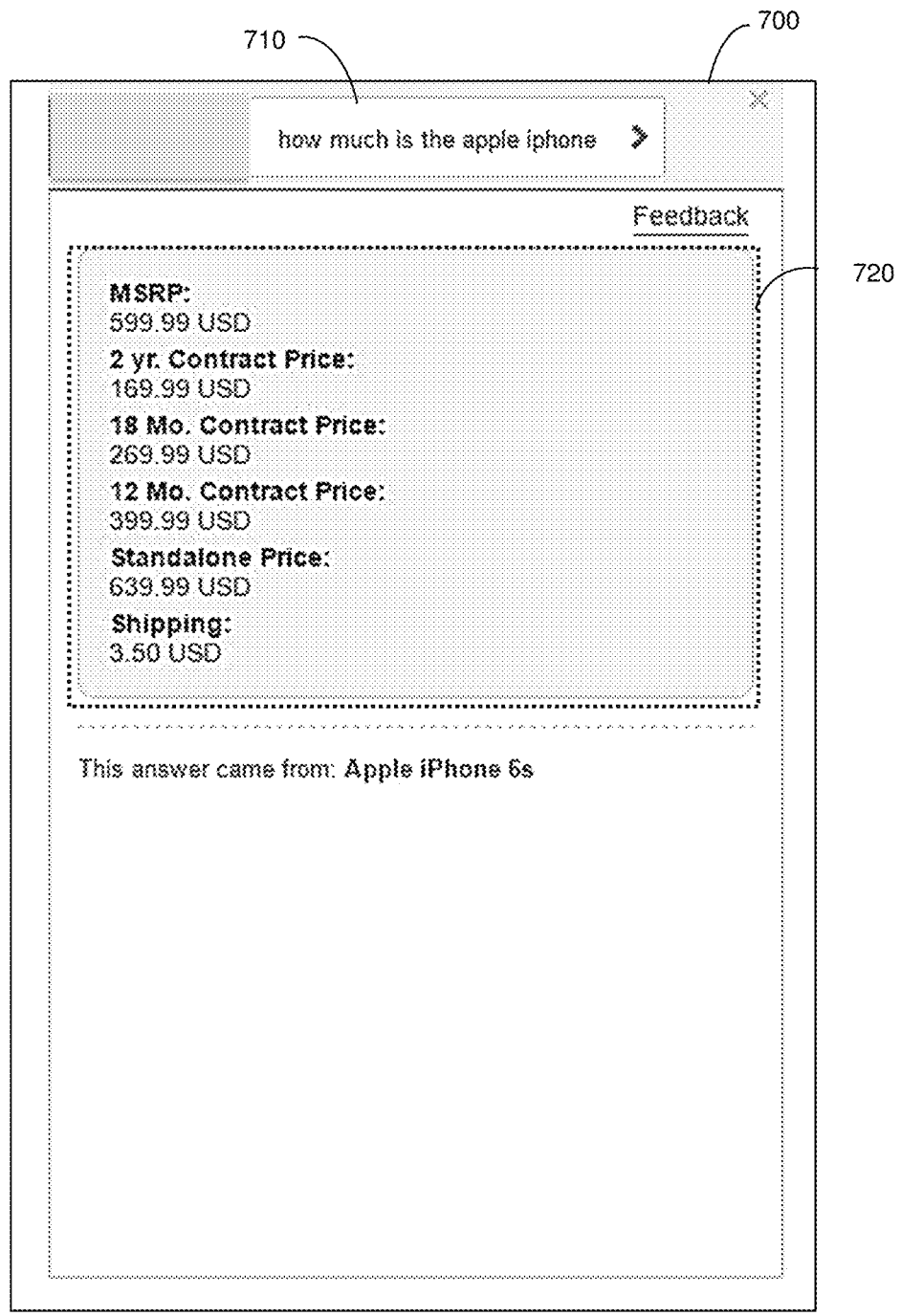
FIG. 7 is a screenshot illustrating a response to a user query based on a question template.
Figure 8:
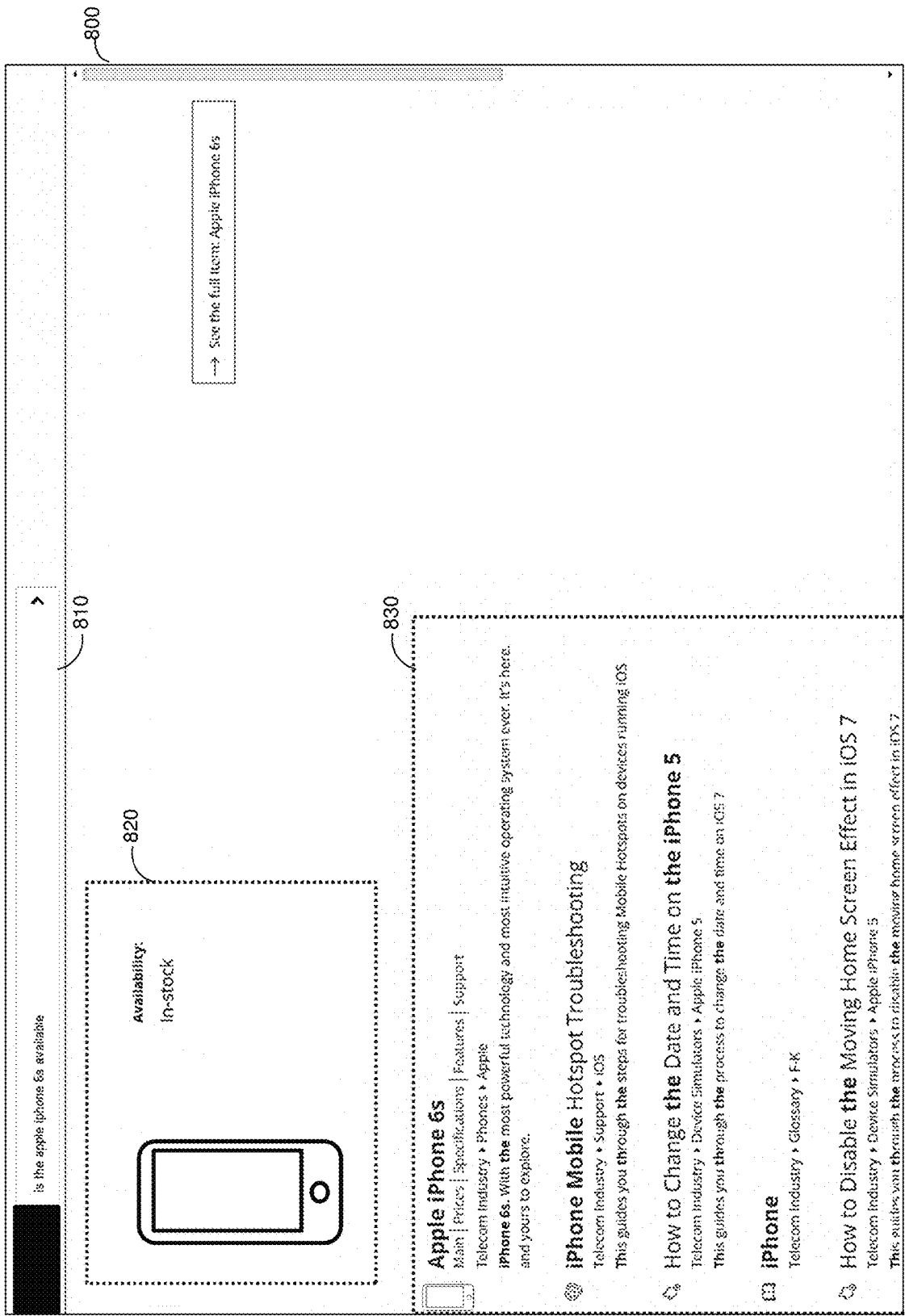
FIG. 8 is a screenshot illustrating a response to a user query.

The answer-related inputs include or indicate (e.g., by indicating a selection or a location in storage) a set of at least one answer and an assignment of each answer set to at least one question template as well as to at least one subject. Each answer includes content which may further include, but is not limited to, images, videos, audio, information, graphs, charts, combinations thereof, and the like. As a non-limiting example, the answer-related inputs may include information related to smartphones such as price, subscription costs, presence or absence of certain components, an image of the phone, a video of the phone in use, a combination thereof, or any other content that may be utilized to answer a user's question. Example answer content is illustrated in FIGS. 6, 7, and 8, each described further herein below. The answer-related inputs may further indicate assignments of such information to appropriate question templates (e.g., price information for the iPhone 7 may be assigned to the combination of a question template defining price-related questions and the subject "iPhone 7").

Defining the answer for each question template including multiple template questions allows for returning the same answer for substantively similar questions. As a non-limiting example, an answer including the text "MSRP: $700" may be returned for both the questions "What is the cost of iPhone 6" and "How expensive is iPhone 6" that are defined in a question template assigned to the subject "iPhone 6".

In an embodiment, the content manager 120 may be configured to store the created question templates as well as assignment data indicating assignments of the created question templates in, e.g., the database 140. It should be noted that, in an embodiment, only template questions (i.e., as opposed to each specific instance of a template question) are stored in the database 140 and utilized to determined potential user questions as needed, thereby resulting in lower usage of computing resources related to storing variations of questions. As a non-limiting example, the template question "what is the price of [Subject_Title]" may be stored (and, optionally, one example variant per subject such as "what is the price of Nintendo Switch"), but other variants such as "what is the cost of [Subject_Title]", "what price [Subject_Title]", and "what is [Subject_Title] price" do not need to be stored to match queries to the template question.

In an embodiment, the content manager 120 may be configured to collect data related to changes to a question template by the administrator of the administrator device 130. The change data may include, but is not limited to, times of changes, portions of the question template modified (e.g., questions, answers, assignments, etc.), and the like. In a further embodiment, the content manager 120 may be configured to generate and send a notification prompting the administrator to revise the questions of the question template when a number of changes to questions in the question template is above a predetermined threshold during a given time period (i.e., when changes are constantly or otherwise frequently occurring, which may indicate that the questions of the question template require closer attention).

In an embodiment, the content manager 120 may be configured to automatically modify created question templates. The modifications may include, but are not limited to, adding questions, changing existing questions, deleting questions (e.g., deleting duplicate questions), adding answers, assigning questions to additional subjects, removing assignments of questions to subjects, and the like. Changing the existing questions may include, but is not limited to, correcting spelling and grammar of template question parameters. In a further embodiment, the content manager 120 may be configured to send a notification to the administrator device 130 prompting the administrator using the administrator device 130 to confirm the modification. If the modification is confirmed, the modification may be performed automatically.

In an embodiment, the content manager 120 may be configured to delete duplicate questions. Questions may be duplicates if they meet matching requirements such as, e.g., each template parameter of a first template question being the same as or a synonym of a corresponding template parameter of a second template question (for example, as indicated in a list of terms and corresponding synonyms), each template parameter of a first template question matching a corresponding template parameter of a second template question except for a misspelling or truncation (for example, as determined based on at least one of a stemmer, a phonetic analyzer, a morphology analyzer, a spellchecker, etc.), differences between two template questions not being substantively different (e.g., the presence of punctuation such as "?", capitalization, words having at most a predetermined number of characters, or stop words such as "is", "of", and "and", occurring in one of the template questions but not in the other), a combination thereof, and the like. Template questions may match if the template parameters are in a different order so long as the above-noted matching requirements are met. As a non-limiting example, the questions "Who is the president of the United States of America?" and "who is USA's President" may be determined to match despite having a different order as well as differences in capitalization, synonyms (i.e., "United States of America" and "USA's"), use of stop words such as "the", and use of "?" as punctuation.

In an embodiment, the content manager 120 may be configured to suggest sets of template question parameters for question templates. The suggested sets of template question parameters may be based on, but not limited to, popular questions that are not defined in the question template (e.g., questions that have been asked above a threshold number of times); template questions defined in other question templates related to the same subject, characteristic, or both; a combination thereof (e.g., popular questions related to the same subject, characteristic, or both); and the like.

In an embodiment, when question templates have been created and assigned, the content manager 120 is configured to receive, from the user device 150, a query, and to determine, based on the received query and the created question templates, a question indicated by the query. The question indicated by the query may be determined with respect to one or more of the sets of template question parameters of the created question templates as well as the characteristic and subjects to which each question template is assigned.

In a further embodiment, the content manager 120 is configured to determine the question indicated by the query by determining a template question matching the query. In yet a further embodiment, the content manager 120 may be configured to identify a subject indicated in the query, a characteristic indicated in the query, or both, and to compare the query only to template questions defined in question templates assigned to the identified subject, template questions assigned to the identified characteristic, or a combination thereof.

In a further embodiment, identifying a subject or characteristic in the query may include applying one or more semantic rules to a potential subject or characteristic in the query. A potential subject or characteristic may be related to a predetermined subject or characteristic, but is not the same or a synonym. As a non-limiting example, a semantic rule for the potential subject "iphone" (i.e., an indicator of a smart phone but without a specific version) may result in identifying the subject based on release date such that the most recent version of the iPhone (e.g., the subject "iPhone 7") is identified.

Comparing the query to a template question may include, but is not limited to, replacing the subject, the characteristic, or both, identified in the query, with the respective identified subject variable, characteristic variable, or both, of the template question to generate a potential user question, and comparing the query to the potential user question to determine if they match.

A query and a potential user question may match if they meet matching requirements such as, e.g., each term of the potential user question being the same as or a synonym of a corresponding term in the query, each term of the potential user question matching a corresponding term in the query except for a misspelling or truncation, the potential user question and the query not being substantively different (e.g., with respect to punctuation, capitalization, short words, and stop words), a combination thereof, and the like. A query and a potential user question may match if the template question parameters of the question are in a different order than that of terms in the query so long as the above-noted matching requirements are met.

In an embodiment, the content manager 120 is configured to send, to the user device 150, a response to the query. In a further embodiment, the response includes a set of answers assigned to the question template and subject of the potential user question that matches the query. In a further embodiment, if multiple potential user questions are determined to match the query, the answers assigned to the potential user question of the highest-ranking question template may be included in the response.

Accordingly, in an embodiment, the content manager 120 is configured to provide only one set of answers to the user's query. Providing only one set of answers to a query allows for providing only the answers that likely provide the specific information the user is looking for as opposed to, e.g., a plurality of search results that the user must sift through, with some results being unrelated or only tangentially related to the user's query. The response may optionally further include search results (e.g., search results obtained by submitting the query to a search engine) as supplemental information to the answer set. Further, by only returning responses including a set of answers to a matching question, only relevant answers are provided, as opposed to simply the closest or "best" answer as determined based on, e.g., the presence of select keywords.

In an embodiment, if no potential user question matches the query, no corresponding answers are included in the response. In a further embodiment, if no template question matches the query, the response includes search results. In another embodiment, the content manager 120 may be configured to generate a notification prompting the administrator using the administrator device 130 to add the query to a question template as a template question.

In another embodiment, if no potential user question matches the query, a set of answers corresponding to a partially matching potential user question may be included in the response such that the response includes answers that are likely to provide the information sought by the user despite the failure to find a match. In a further embodiment, a potential user question partially matches the query if there is partial matching between a subject identified in the query and a subject in the potential user question, the terms in the query and in the potential user question otherwise meet the above-noted matching requirements (i.e., terms other than terms indicating the subject), and there is no other matching potential user question. As a non-limiting example, for a question template including the template question "Who is the [prime_minister] of [Subject_Title]" assigned to the subject "the State of Israel" (i.e., such that a potential user question is "who is the prime minister of the State of Israel"), a query "who is the prime minister of Israel" may be considered partially matching to the potential user question such that a set of answers assigned to the template question (e.g., a set of answers including the name of the current prime minster of Israel) is returned if there are no other matching potential user questions. However, for a query "where is the prime minister of Israel", the template question would not be partially matching (and, thus, no assigned answers would be returned) because the word "where" in the query differs from the word "who" in the template question.

It should be noted that the embodiments described herein above with respect to FIG. 1 are described with respect to one administrative device 130 merely for simplicity purposes and without limitation on the disclosed embodiments. Multiple administrative devices, multiple user devices, or both, may be equally utilized without departing from the scope of the disclosure.

Figure 5:
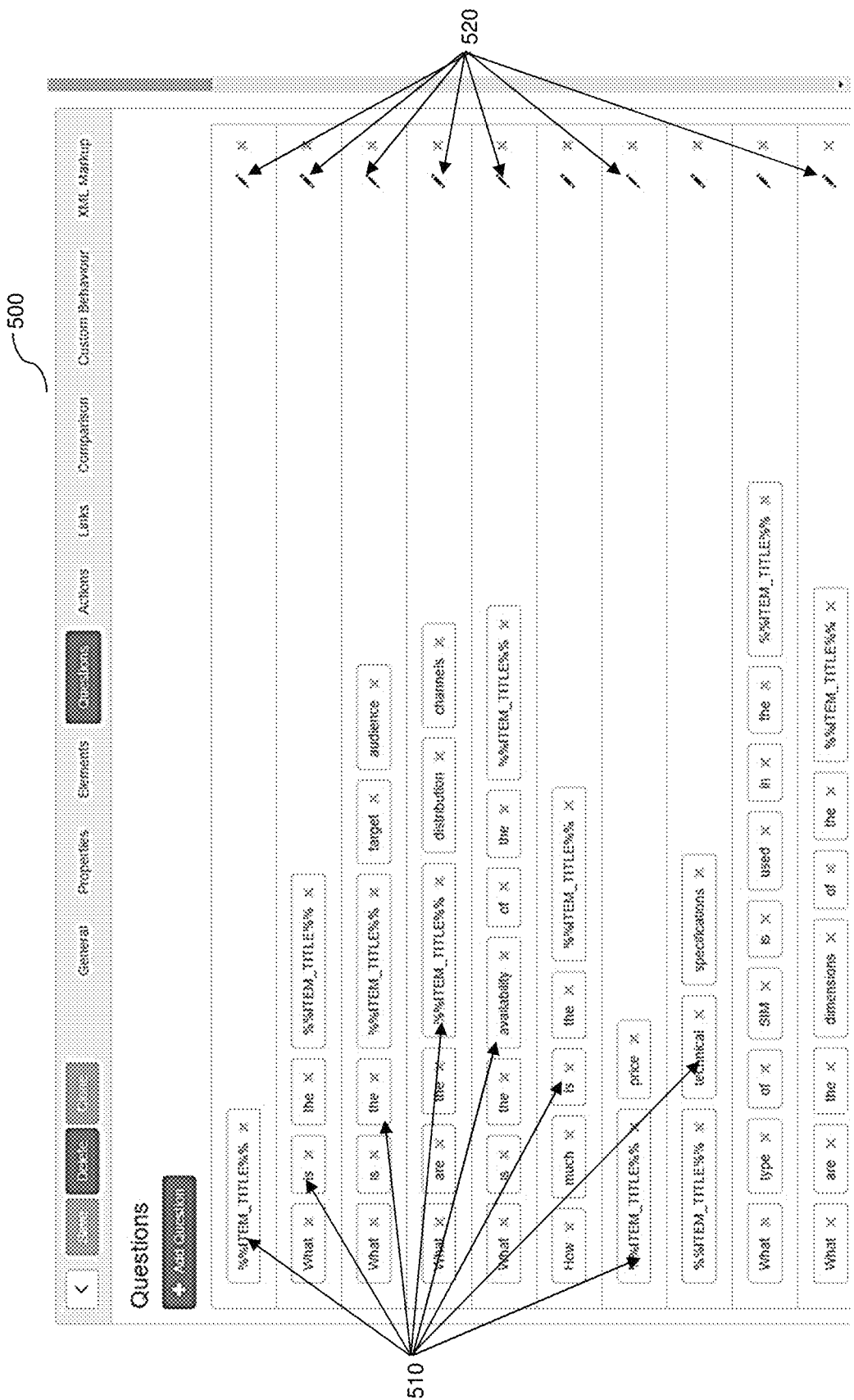
FIG. 5 is a screenshot illustrating a graphical user interface for providing question-related inputs.

Non-limiting example screenshots illustrating defining template questions, assigning a set of answers to a question template, and returning a response based on a created question template, respectively, are shown in FIGS. 5-7.

FIG. 5 shows an example implementation for receiving question-related inputs. In FIG. 5, an example screenshot 500 shows a graphical user interface utilized by an administrator to provide the question-related inputs. The example screenshot 500 shows a plurality of parameter icons 510, each representing a template question parameter selected by an administrator. In an example implementation, the selections may be made by dragging and dropping the icons 510. The example screenshot 500 also shows an answer assignment button 520 for each question template. The answer assignment button 520, when clicked on, may cause display of an answer assignment interface (not shown in FIG. 5). In the example implementation shown in FIG. 5, subject variables are represented by the icons 510 including "%%Item_Title%%".

FIG. 6 shows an example screenshot 600 demonstrating provision of answer-related inputs. The example screenshot 600 includes a list of available answers 610 and a list of assigned answers 620. The example screenshot 600 shows a graphical user interface, where display of the graphical user interface may be triggered in response to clicking on an answer assignment button for a question template displayed in a listing of question templates for a particular subject (e.g., as seen in FIG. 5). In the example screenshot 600, answers may be assigned to the question template with respect to the subject by dragging and dropping answers from the list of available answers 610 to the list of assigned answers 620.

FIG. 7 shows an example screenshot 700 illustrating a response to a user query based on a question template. In the example screenshot 700, a search bar 710 allows a user to input a free text query. In the example screenshot 600, the user has entered the query "how much is the apple iphone". The search bar 710 may optionally include autocomplete options for guiding a user in choosing common or otherwise known user questions. Based on a matching potential user question and a question template including the template question "how much is the [Subject_Title]", a plurality of assigned answers related to MSRP, various contract prices, a standalone price, and a shipping cost, respectively, are determined. The question template is associated with the subject "Apple iPhone 6", which is a partial match for "apple iphone". No other matching potential user questions are determined. A response including the determined answers is generated and displayed in a response window 720.

Figure 2:
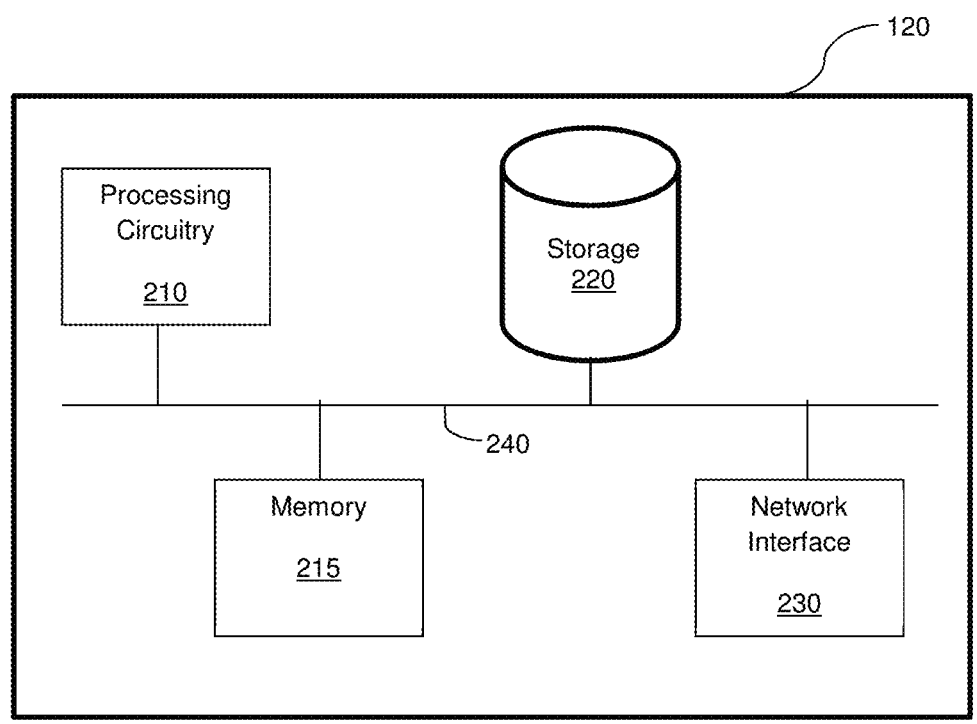
FIG. 2 is a schematic diagram of a content manager according to an embodiment.

FIG. 2 is an example schematic diagram of the content manager 120 according to an embodiment. The content manager 120 includes a processing circuitry 410 coupled to a memory 215, a storage 220, and a network interface 230. In another embodiment, the components of the content manager 120 may be communicatively connected via a bus 240.

The processing circuitry 210 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 215 may be volatile (e.g., RAM, etc.), non-volatile (e.g., ROM, flash memory, etc.), or a combination thereof. In one configuration, computer readable instructions to implement one or more embodiments disclosed herein may be stored in the storage 220.

In another embodiment, the memory 215 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 210 to perform the various processes described herein. Specifically, the instructions, when executed, cause the processing circuitry 210 to perform an on-demand authorization of access to protected resources, as discussed hereinabove.

The storage 220 may be magnetic storage, optical storage, and the like, and may be realized, for example, as flash memory or other memory technology, CD-ROM, Digital Versatile Disks (DVDs), or any other medium which can be used to store the desired information. The storage 220 can primarily store question templates to be processed.

The network interface 230 allows the content manager 120 to communicate with the administrative device 130, the databases 140, the user device 150 or a combination of, for the purpose of, for example, receiving template inputs, storing created question templates and assignment data, receiving queries, providing responses, and the like.

It should be understood that the embodiments described herein are not limited to the specific architecture illustrated in FIG. 2, and that other architectures may be equally used without departing from the scope of the disclosed embodiments.

Figure 3:
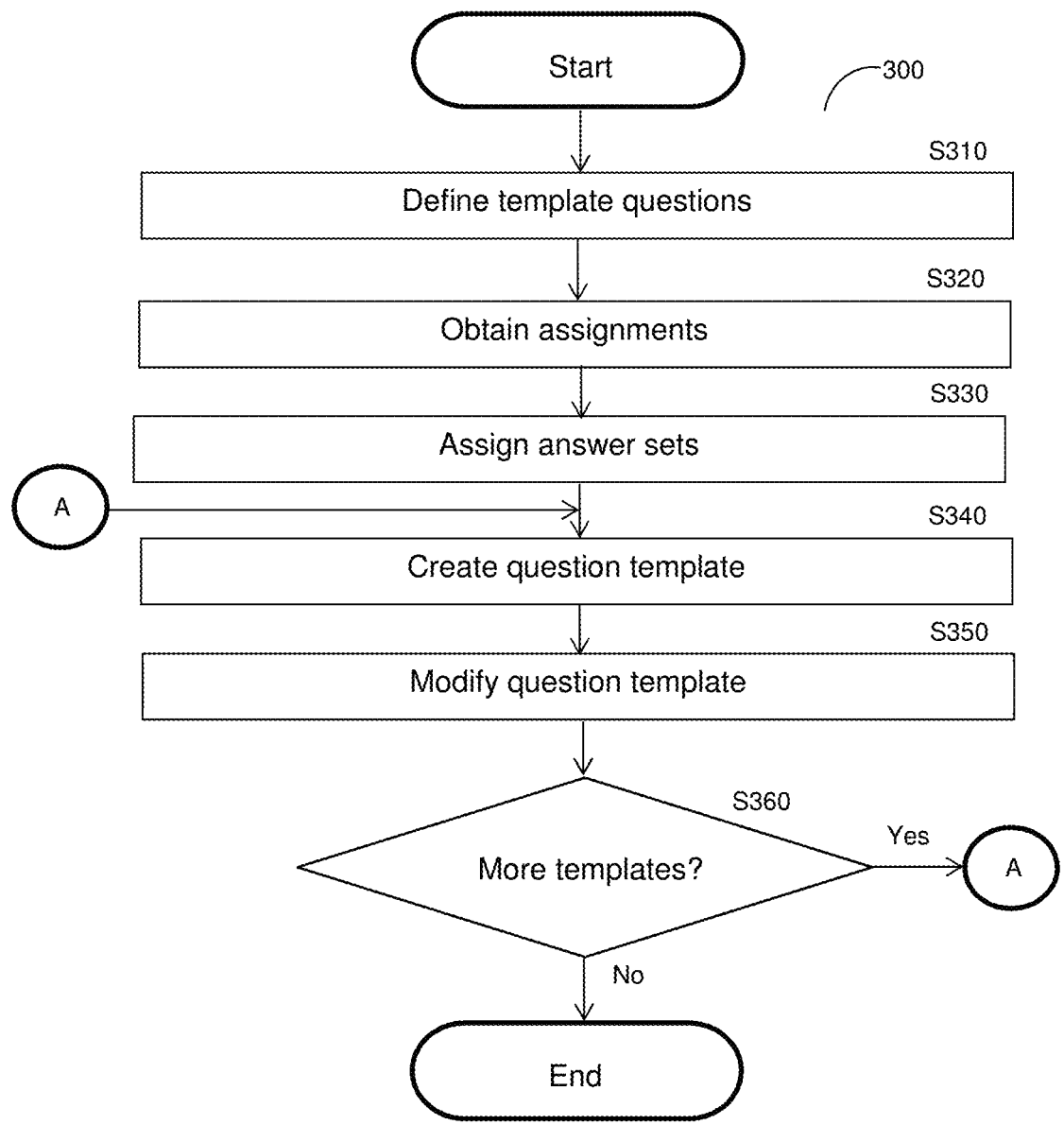
FIG. 3 is a flowchart illustrating a method for creating question templates according to an embodiment.

FIG. 3 is a flowchart 300 depicting the method for creating a question template according to an embodiment. In an embodiment, the method may be performed by the content manager 120, FIG. 1.

At S310, at least one template question is defined. Each template question is defined based on a set of template question parameters. To this end, in an embodiment, S310 includes receiving at least one set of template question parameters from, e.g., an administrator device (e.g., the administrator device 130, FIG. 1).

The template question parameters may include, but are not limited to, subject variables, characteristic variables, terms forming a structure of the question (e.g., "who", "what", "when", "where", "why", "how", "is", "are", "the", "does", "can", etc.), terms indicating degree (e.g., "much", "many", "amount", "number", etc.), images or other multimedia content submitted as a query, and any other information utilized to define questions. The subject and characteristic variables represent a subject and a characteristic mentioned in the template question, and may be replaced with particular values to determine a potential user question to be matched to a query.

As a non-limiting example, a set of template question parameters may be "does %%Subject_Title%% include %%Characteristic_Title%%", where "%%Subject_Titl%%" is the subject variable and "%%Characteristic_Title%%" is the characteristic variable. When comparing the template question defined by such template question parameters to a query mentioning the subject "apple ipad 3" and the characteristic "camera", a potential user question would be "does apple ipad 3 have camera".

At S320, at least one subject assignment is obtained. The at least one subject assignment includes at least one subject to which the created question template will be assigned. In an embodiment, S320 includes receiving assignment inputs indicating the at least one subject assignment from, e.g., the administrator device.

At S330, a set of at least one answer is assigned to the at least one template question with respect to each assigned subject. Each assigned answer includes content such as, but not limited to, information, pictures, videos, charts, graphs, and the like. In an embodiment, S330 includes receiving answer inputs indicating the answers to be assigned to the at least one template question from, e.g., the administrator device. The answer inputs may include, but are not limited to, content to be included in each answer, an identifier (e.g., a selection or a location in storage) of content to be included in each answer, and the like. In a further embodiment, S330 may include obtaining the content for each answer.

At S340, a question template including the defined at least one template question, the answer set assigned to the at least one template question for each subject, and an assignment to the at least one subject is created. In an embodiment, S340 may include storing the created question template in a storage (e.g., the database 140, FIG. 1).

At optional S350, the created question template may be modified. The modifications may include, but are not limited to, adding template questions, deleting template questions, editing template questions, adding answers, combinations thereof, and the like. The modifications may be provided by an administrator, or may be modified based on one or more modification rules.

Adding the template questions may include, for example, identifying potential template questions to be added based on popularity with respect to the same subject or based on a query for which a matching question template could not be found. Deleting the template questions may include, for example, deleting duplicate questions assigned to the same subject. In an embodiment, S350 may include sending a notification with proposed modifications and prompting an administrator to accept, reject, or change the proposed modifications.

At S360, it is determined if additional question templates are to be created and, if so, execution continues with S310; otherwise, execution terminates. Defining multiple question templates allows for population of a template database for subsequent use.

Figure 4:
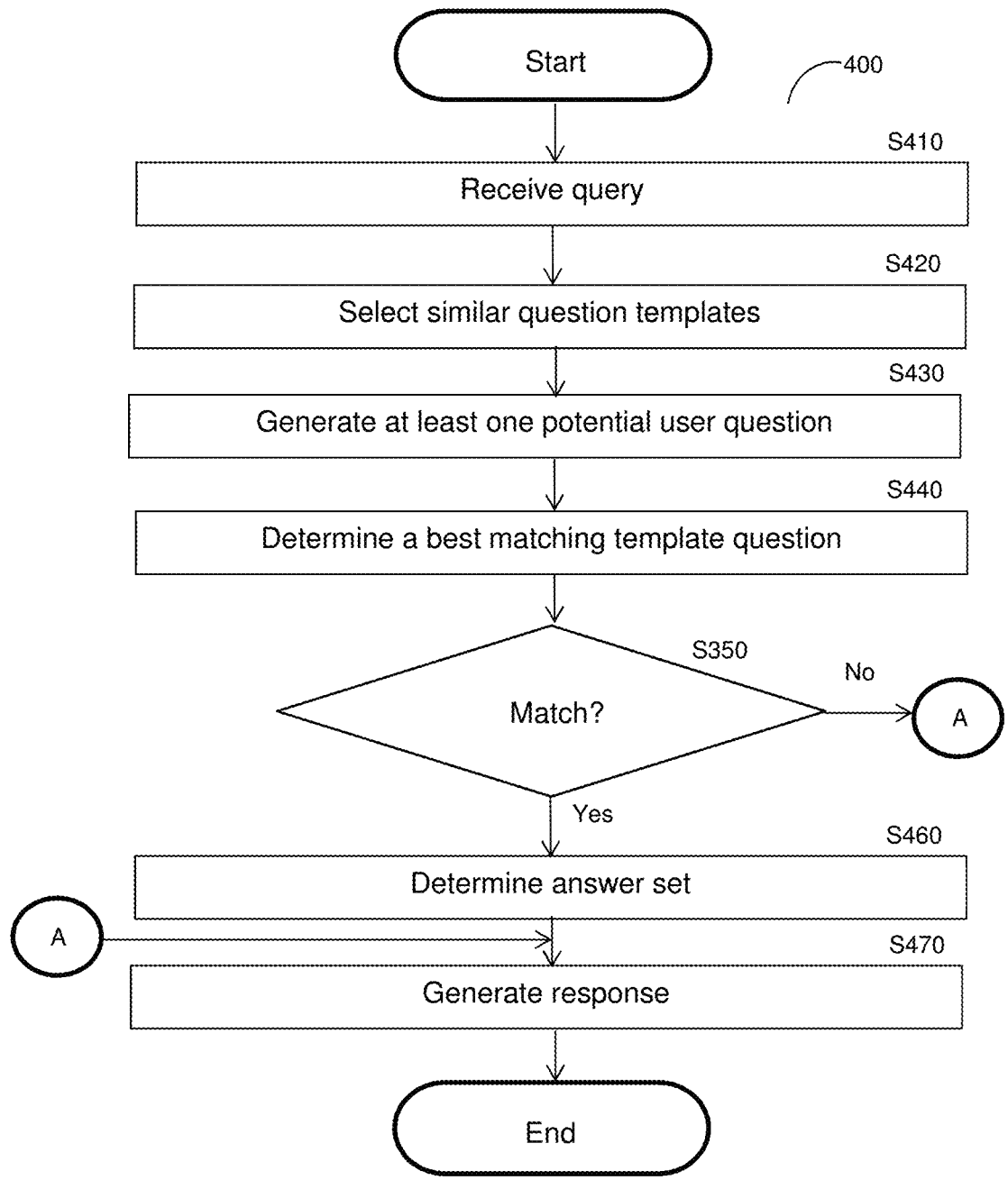
FIG. 4 is a flowchart illustrating a method for providing responses to queries using question templates according to an embodiment.

It should be noted that the steps of the method illustrated in FIG. 3 are shown being performed sequentially merely for simplicity purposes and without limitation on the disclosed embodiments. In particular, FIG. 4 is an example flowchart 400 illustrating a method for generating responses to queries using question templates according to an embodiment. In an embodiment, the method may be performed by the content manager 120, FIG. 1. In a further embodiment, the method may be performed based on question templates created as described herein above with respect to FIG. 3.

At S410, a query is received. The query may include, but is not limited to, text, images, both, and the like. The query may be received from a user device (e.g., the user device 150, FIG. 1).

At S420, at least one similar question template is selected based on the query. In an embodiment, S420 includes identifying terms in the query and comparing the identified terms to terms of each of a plurality of template questions, where each template question is associated with a predetermined question template. The identified terms may include, but are not limited to, structural words (e.g., question words such as "who" and "what", definite articles such as "the", conjunctions such as "and", etc.), words representing a subject, words representing a characteristic, a combination thereof, and the like.

In an embodiment, S420 may include comparing the identified terms to predetermined structural words, predetermined subjects, predetermined characteristics, or a combination thereof, of each of the plurality of template questions, and calculating a similarity score for each template question. In a further embodiment, the selected question template may be the question template associated with the template question having the highest similarity score.

At S430, at least one potential user question is generated based on template questions of the at least one similar question template. In a further embodiment, S430 includes replacing each subject variable in each template question of the at least one similar question template with the identified subject of the query, replacing each characteristic variable in a template question with the identified characteristic of the query, or both, thereby generating a potential user question including a plurality of terms. If a template question does not include any variables (e.g., if the template question is a unique template question lacking variables), the template question may be utilized as one of the at least one potential user question.

At S440, each of the generated at least one potential user question is compared to the query to determine a template question that best matches the query. In an embodiment, S440 includes comparing each term of the query to each term of each potential user question. In a further embodiment, the comparison is based on one or matching rules. The matching rules for matching between a query and a potential user question may include, but are not limited to, each term of the potential user question being the same as or a synonym of a corresponding term in the query, each term of the potential user question matching a corresponding term in the query except for a misspelling or truncation, the potential user question and the query not being substantively different (e.g., with respect to punctuation, capitalization, short words, and stop words), a combination thereof, and the like. A query and a potential user question may match if the template question parameters of the question are in a different order than that of terms in the query so long as the above-noted matching requirements are met.

In an embodiment, if multiple potential user questions generated based on different template questions matched the query, the highest ranked template question may be determined. In another embodiment, if no template question matches the query (e.g., if no template question meets the matching rules), S440 may result in a null value.

At S450, it is determined if the query matches a potential user question and, if so, execution continues with S460; otherwise, execution continues with S470. In an embodiment, the query does not match a potential user question if S440 resulted in a null value.

At S460, when it is determined that the query matches a potential user question, a question template for responding to the query is selected. The selected question template is the question template including the best matching template question.

At S470, a response to the query is generated. If an answer set is determined at S460, the generated response includes the determined answer set. If no answer set is determined at S460, the generated response may include search results obtained by sending the query to a search engine. It should be noted that search results may also be included in the generated response in addition to the determined answer set in order to, e.g., provide supplemental information with the answer set.

FIG. 8 is an example screenshot 800 illustrating a response to a user query. The example screenshot 800 shows a search bar 810, a response portion 820, and a search results portion 830. The search bar 810 allows a user to input free text queries. In the example screenshot 800, the user has entered the query "is the apple iphone 6s available". Based on the query, a matching template question is determined, and answers including an image of an iPhone and information regarding availability that are assigned to the matching template question are displayed in the response portion 820. Additionally, search results from a search engine are displayed in the search results 830. The example response shown in FIG. 8 may be utilized for, e.g., providing search results as supplemental information for a single direct answer to the user's query.

Figure 9:
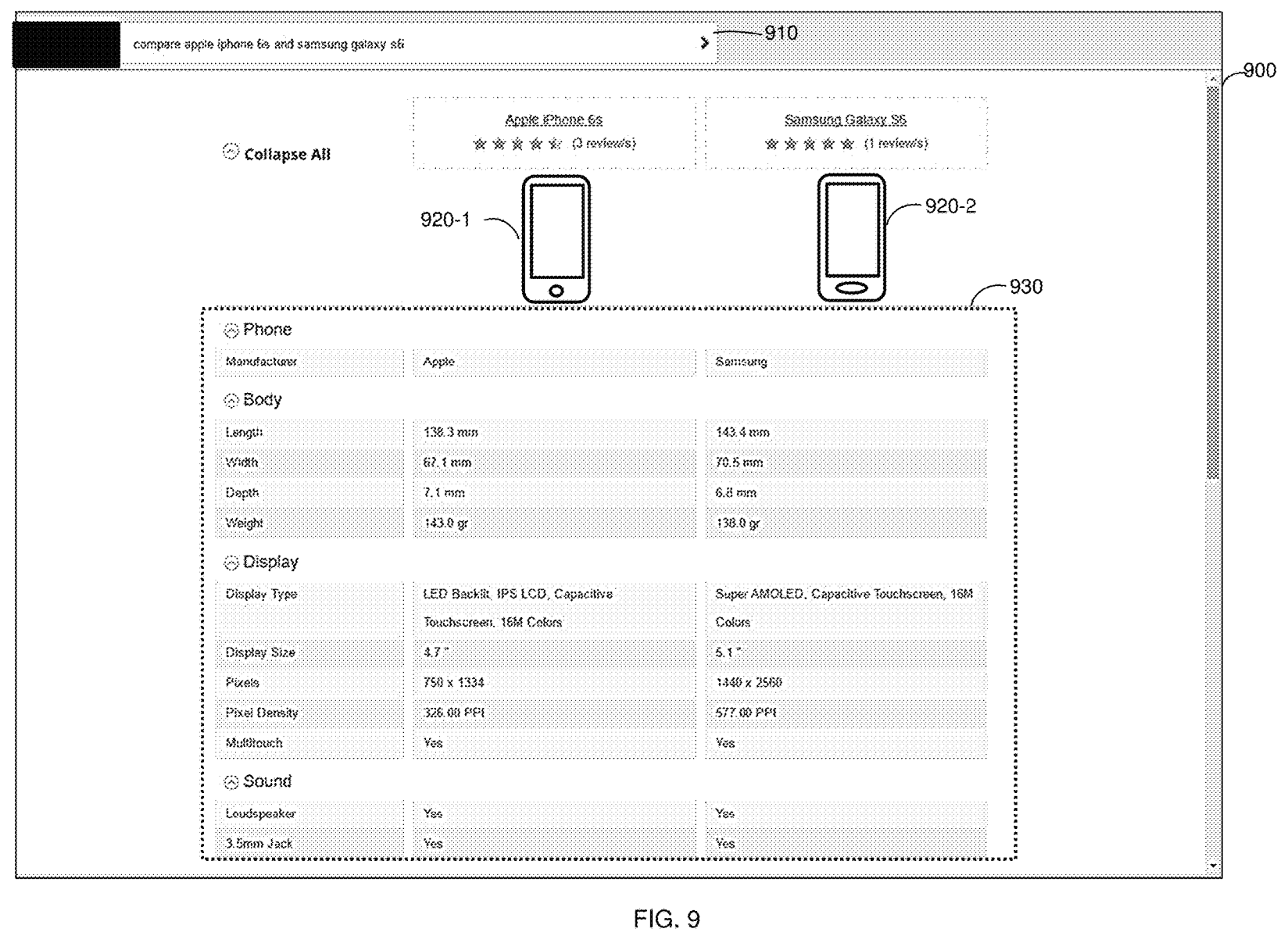

FIG. 9 is an example screenshot 900 illustrating a comparison chart provided as a response to a user query. The example screenshot 900 includes a search bar 910, images 920-1 and 920-2, and a comparison chart 930. The search bar 910 allows a user to input free text queries. In the example screenshot 900, the user has entered the query "compare apple iphone 6s and samsung galaxy 6s". Based on the query, a matching template question is determined, and answers including images 920-1 and 920-2 of an iPhone 6s and a Samsung Galaxy S6, respectively, as well as a comparison chart 930 illustrating a side-by-side comparison of various specifications of the respective phones, are displayed.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

The invention claimed is:

1. A method for handling queries, comprising:
in a first phase:
creating a plurality of question templates, wherein creating each respective question template of the plurality includes:
receiving a plurality of template inputs, the template inputs including a set of template question parameters;
defining at least one template question based on the set of template question parameters wherein each template question is useable to form more than one question by using at least two of the set of template question parameters making up the template question, wherein at least one of the set of template question parameters is a term and wherein a required template question parameter for each template question is at least one subject; and
creating the question template based on the received plurality of template inputs, the created question template including (i) the defined at least one template question (ii) the at least one subject, which the question template is assigned to, and (iii) a set of answers;
in a second phase performed after the first phase:
receiving a query;
selecting, based on the query, a question template that is similar to the query, each similar question template including at least one template question, wherein selecting the at least one similar question template further comprises:
identifying a plurality of terms in the received query; and
calculating a similarity score for each template question based on a comparison between the identified terms in the query and the at least one term of each template question of each selected question template, wherein the question template determined to be similar to the query is the question template having the template question having a highest score;
generating, based on the at least one template question of each similar question template, at least one potential user question, each at least one potential user question having at least one term;
determining, based on a comparison of the plurality of terms of the received query to each of the at least one term of each generated potential user question a potential user question having a highest ranked match to the query;
selecting, from among the plurality of question templates, a question template for responding to the query, wherein the selected question template is the question template that includes the template question on which the highest ranked potential user question was based; and
generating, based on the question template selected for responding to the query, a response to the query, the generated response including the set of answers of the question template selected for responding to the query;
in a third phase performed after the first phase:
collecting data related to changes made to at least one of the question templates of the plurality;
sending a notification to revise the at least one changed question template when a number of changes to the at least one changed question template is above a predetermined threshold during a given time period.

2. The method of claim 1, wherein the identified terms of the query include at least one of a subject and a characteristic, wherein each template question includes at least one of a subject variable and a characteristic variable.

3. The method of claim 2, wherein generating the at least one potential user question further comprises:
   replacing each subject variable of each template question of each similar question template with the identified subject term.

4. The method of claim 2, wherein generating the at least one potential user question further comprises:
   replacing each characteristic variable of each template question of each similar question template with the identified characteristic term.

5. A non-transitory computer readable medium having stored thereon instructions for causing one or more processing units to perform a process, the process comprising:
   in a first phase:
      creating a plurality of question templates, wherein creating each respective question template of the plurality includes:
         receiving a plurality of template inputs, the template inputs including a set of template question parameters;
         defining at least one template question based on the set of template question parameters wherein each template question is useable to form more than one question by using at least two of the set of template question parameters making up the template question, wherein at least one of the set of template question parameters is a term and wherein a required template question parameter for each template question is at least one subject; and
         creating the question template based on the received plurality of template inputs, the created question template including (i) the defined at least one template question (ii) the at least one subject, which the question template is assigned to, and (iii) a set of answers;
   in a second phase performed after the first phase:
      receiving a query;
      selecting, based on the query, a question template that is similar to the query, each similar question template including at least one template question, wherein selecting the at least one similar question template further comprises:
         identifying a plurality of terms in the received query; and
         calculating a similarity score for each template question based on a comparison between the identified terms in the query and the at least one term of each template question of each selected question template, wherein the question template determined to be similar to the query is the question template having the template question having a highest score;
      generating, based on the at least one template question of each similar question template, at least one potential user question, each at least one potential user question having at least one term;
      determining, based on a comparison of the plurality of terms of the received query to each of the at least one term of each generated potential user question a a potential user question having a highest ranked match to the query;
      selecting, from among the plurality of question templates, a question template for responding to the query, wherein the selected question template is the question template that includes the template question on which the highest ranked potential user question was based; and
      generating, based on the question template selected for responding to the query, a response to the query, the generated response including the set of answers of the question template selected for responding to the query;
   in a third phase performed after the first phase:
      collecting data related to changes made to at least one of the question templates of the plurality;
      sending a notification to revise the at least one changed question template when a number of changes to the at least one changed question template is above a predetermined threshold during a given time period.

6. A system for handling queries, comprising:
   a processing circuitry; and
   a memory, wherein the memory contains instructions that, when executed by the processing circuitry, configure the system to:
   in a first phase:
      create a plurality of question templates, wherein creating each respective question template of the plurality includes:
         receiving a plurality of template inputs, the template inputs including a set of template question parameters;
         define at least one template question based on the set of template question parameters wherein each template question is useable to form more than one question by using at least two of the set of template question parameters making up the template question, wherein at least one of the set of template question parameters is a term and wherein a required template question parameter for each template question is at least one subject; and
         create the question template based on the received plurality of template inputs, the created question template including (i) the defined at least one template question (ii) the at least one subject, which the question template is assigned to, and (iii) a set of answers;
      receive a query;
      select, based on the query, a question template that is similar to the query, each similar question template including at least one template question, wherein selecting the at least one similar question template further comprises:
         identify a plurality of terms in the received query; and
         calculate a similarity score for each template question based on a comparison between the identified terms in the query and the at least one term of each template question of each selected question template, wherein the question template determined to be similar to the query is the question template having the template question having a highest score;
      generate, based on the at least one template question of each similar question template, at least one potential user question, each at least one potential user question having at least one term;
      determine, based on a comparison of the plurality of terms of the received query to each of the at least one term of each generated potential user question a a potential user question having a highest ranked match to the query;

select, from among the plurality of question templates, a question template for responding to the query, wherein the selected question template is the question template that includes the template question on which the highest ranked potential user question was based; and generate, based on the question template selected for responding to the query, a response to the query, the generated response including the set of answers of the question template selected for responding to the query;

in a third phase performed after the first phase:

collect data related to changes made to at least one of the question templates of the plurality;

send a notification to revise the at least one changed question template when a number of changes to the at least one changed question template is above a predetermined threshold during a given time period.

7. The system of claim 6, wherein the identified terms of the query include at least one of a subject and a characteristic, wherein each template question includes at least one of a subject variable and a characteristic variable.

8. The system of claim 7, wherein generating the at least one potential user question further comprises:

replace each subject variable of each template question of each similar question template with the identified subject term.

9. The system of claim 7, wherein generating the at least one potential user question further comprises:

replace each characteristic variable of each template question of each similar question template with the identified characteristic term.

* * * * *